May 8, 1945.  C. B. SEYMOUR  2,375,498
FLUID LOCKOUT DEVICE
Filed Jan. 14, 1941
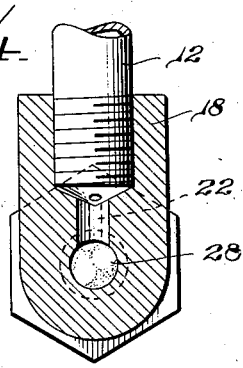
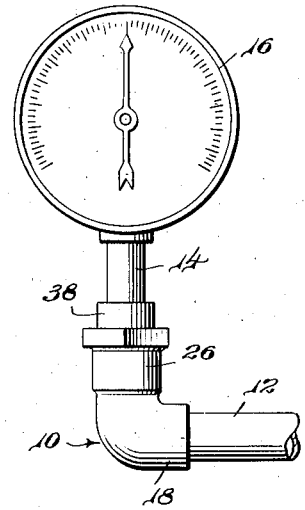
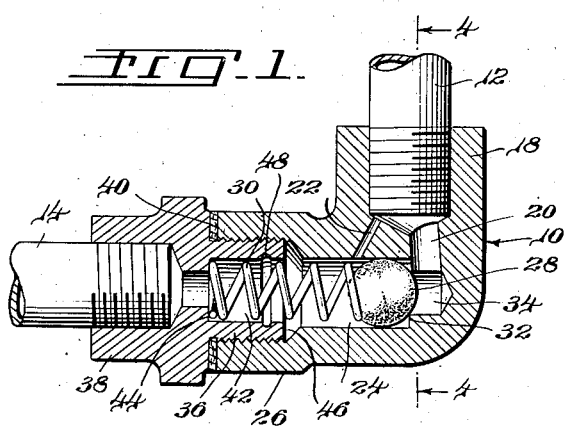
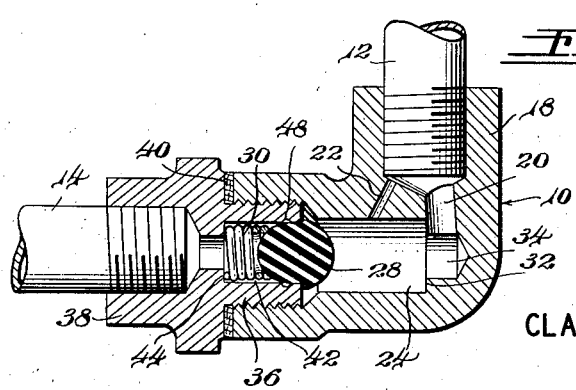
Inventor
CLAYTON B. SEYMOUR
By Cort. Moore & Olson
Attorneys Patented May 8, 1945

2,375,498

UNITED STATES PATENT OFFICE 2,375,498

FLUID LOCKOUT DEVICE

Clayton B. Seymour, Chicago, Ill., assignor to Hoof Products Company, Chicago, Ill., a corporation of Illinois Application January 14, 1941, Serial No. 374,405

2 Claims. (Cl. 251—118)

The present invention relates to a safety device for fluid pressure systems and more particularly to a safety device for closing a pressure line in response to failure.

Yet more particularly, the present invention is concerned with a device providing free passage of hydraulic or other fluid in the line during normal operation but operative in the event of leakage or failure to close off the conduit, thus preventing a failure of the entire system. Devices of the present class with which I have been hitherto familiar have been seriously limited in utility by virtue of structural inability to operate as intended and desired under all conditions. Thus, many of the devices with which I am familiar exert only a temporary sealing action whereby they function only so long as the hydraulic system with which they are associated is under pressure. Accordingly, therefore, release of pressure, as is necessary, may and frequently does result in loss of hydraulic fluid and failure of the entire system. Other constructions capable of exerting a more positive sealing action are in general incapable of operating except under favorable conditions when in a predetermined position. All of these constructions may be likely to fail by closure of the hydraulic line with which they are associated under certain normal operating conditions and before actual leakage occurs.

It is an important object of the present invention to provide an improved pressure lockout device obviating the foregoing difficulties and adapted to positively protect the fluid pressure system by permanently sealing a predetermined conduit under conditions of failure while assuring maintenance of a free and open conduit at all other times.

Yet more particularly, the invention has for its further objects to provide a construction as above operative in any and all positions and under all service conditions; to provide an improved lockout which is simplified and compact in construction and capable of being inserted in a fluid conduit; to provide a lockout which in addition to the foregoing objects is capable of providing an integral seal which remains permanent under all subsequent conditions of pressure, and to provide a device as above operative under the influence of gaseous as well as liquid fluid systems.

Yet other and further objects will be apparent from a consideration of the following specification when taken with the attached drawing, wherein:

Figure 1 is a transverse sectional view taken centrally through a hydraulic lockout device constructed in accordance with the present invention;

Figure 2 is a view the same as Figure 1 but showing the device in conduit sealing position;

Figure 3 is an elevational view of the present lockout applied to a pressure responsive gauge; and Figure 4 is a detailed sectional view taken on the line 4—4 of Figure 1.

Referring now to the figures of the drawing, wherein one illustrative embodiment of the invention is disclosed more in detail, there is shown a hydraulic lockout device 10 interposed in a hydraulic fluid conduit comprising an inlet conduit 12 and an outlet conduit 14. Figure 3 illustrates the device as being interposed in a conduit extending from a suitable pressure creating source, not shown, to a pressure responsive gauge 16, although it will be apparent that the present invention is not so limited in utility but may be applied to any pressure conduit which must be sealed upon operative failure thereof.

The lockout unit 10 comprises in general an L-shaped body portion having an inlet arm and an outlet arm extending at right angles to each other. This L-shaped body portion lends itself favorably to the arrangement of outlet and inlet as the separate pressure passages from the inlet deliver on opposite sides of the valve, and such advantageous disposition of the pressure inlets is conveniently brought about. The inlet arm 18 is of cylindrical tubular form threaded to receive the extremity of the inlet conduit 12 and it should be noted that the threaded bore terminates inwardly in a pair of spaced passages 20 and 22 leading to a central bore 24 in the angularly disposed arm 26. The bore 24 is relatively large to accommodate therein a resilient sealing member or sphere 28, it being understood that the sphere is relatively loosely disposed in the cylindrical bore and adapted to freely shift longitudinally thereof. A helical coil spring 30 yieldably urges the yieldable valve member 28 to the right-hand extremity of the large bore 24 and against an annular shoulder 32 formed by juncture of the large bore 24 with a smaller axially aligned bore 34. Attention is directed to the fact that the smaller bore at the rearward side of the resilient sphere 28 communicates with the passage 20 from the inlet, whereas the relatively small passage 22 extends to the forward side of the resilient valve member in the vicinity of the outlet portion of the device. The compression spring 30 operatively seats within a bushing portion 36 of an outlet fitting 38, the bushing extension being threadedly received within the arm 26 of the body portion as clearly shown in Figures 1 and 2 and being sealed thereagainst by a packing washer 40. It should be noted that the bushing portion of the fitting provides a cylindrical recess 42 of substantial axial extent in axial alignment with the bore or chamber 24 terminating in an annular shoulder 44 upon which the left-hand extremity of the spring is adapted to seat. The outlet conduit 14 is threadedly received within the fitting as clearly shown.

It is particularly important to note that the central bushing recess 42 provides a substantial space for accommodation of the entire spring 30 when under compression. In this connection, it should be further noted that the extremity of the bushing 36 presents a shoulder 46 providing a relatively constricted opening with respect to the diameter of the main chamber 24 and with respect to the normal diameter of the resilient valve 28. Accordingly, therefore, under conditions adapted to urge the sphere 28 forcefully toward the outlet, the helical spring yields to permit interlocking engagement with the constricted aperture in the shoulder 46. In other words, as clearly illustrated in Figure 2, under such conditions the spring retracts to permit the valve to enter the port in permanent sealing interengagement. To enhance and facilitate this interengagement, I have provided the interior surface of the bushing with an annular recess 48 in the vicinity of the shoulder 46.

Attention is yet additionally directed to the fact that of the two inlet passages 20 and 22, the latter is relatively restricted in section. Thus, the passage 20 to the rear of the resilient valve member possesses a sectional dimension substantially three times that of the adjacent passage 22. It has been observed that with this arrangement, the operation of the device upon failure in the outlet conduit 12 becomes instantaneous and positive, while normal operation of the system remains unimpeded at all times and under all conditions while outlet portions of the system are in operative condition. In other words, the construction, while instantaneous and positively protective against failure, is incapable of so operating as to impede the system when in normal operation. While certain preferred relative dimensions of the passages 20 and 22 have been selected for purpose of illustration, it is to be understood that this may vary within wide limits, provided that the passage 20 to the rear side of the valve is of substantially increased dimension.

From the foregoing, it will be apparent that in operation the present lockout is interposed in a conduit adapted to convey fluid flow or pressures under widely varying conditions, for example, disposed within a conduit 12 connected within a hydraulic pressure system. Under all normal operative conditions in spite of varying pressures the resilient sphere 28 remains in the position shown in Figure 1. Failure at the outlet conduit 14 resulting in release of pressure applied through the inlet conduit 12 results in instantaneous movement of the valve member 28 against the spring 30 and into the position shown in Figure 2 where it permanently seals into the outlet port at the shoulder 46 and additionally interlockingly engages with the annular recess 48.

It is important to note that, having reached this position, the entire pressure exerted by the line 12 is applied, integrally engaging the valve member 28 within the adjacent port, whereby upon release of pressure, the valve remains rigidly interengaged and operative to permanently seal the outlet conduit 14. It is particularly important to note that under the relatively high pressure conditions which may prevail within such system, the spherical valve 24 is apparently compressed somewhat in diameter, causing the material thereof to flow sealingly within the port in a manner which would be impossible were an inserting pressure merely applied against a rear face of the valve. It will be obvious from the foregoing that release of the pressure results in a continuancy of expansion of the sphere within the port, resulting in a positive engagement therewith under a pressure corresponding to the maximum pressure exerted by the instant hydraulic system. Repeated application of pressures therefore merely results in a more permanent and positive interengagement of the valve and valve seat.

It will be understood from the foregoing that the valve member 28 may be composed of any suitable yieldable resilient material such a rubber composition or any of the so-called artificial rubbers or elastic materials such as "Duprene," "Thiolkol," and the like. It is further important to note that the fitting 38 being removable permits removal of the unit subsequent to operation thereof. In other words, the fitting 38, together with the permanently interlocked valve 28 and the spring 30, may be disengaged from the body portion of the lockout unit for substitution of replacement parts, placing the device in its original operative condition shown in Figure 1.

The present invention provides a positively operating, reliable hydraulic lockout valve of simplified construction adapted to permanently seal any selected hydraulic conduit under conditions of failure and under substantially all conditions of service. Thus, the device will operate in any position and under widely varying conditions of vibration, inertia and the like.

It is very important to note that the present invention is distinguished from many of those hitherto known in that it is equally applicable to fluid pressure systems employing a gaseous fluid and, while for purposes of illustration I have selected a hydraulic braking or control system utilizing incompressible fluids, the same construction might equally well be employed in an equivalent system wherein air is employed to operate one or more brakes or the like. In other words, the utility of the device is not limited by virtue of the fluid selected.

It is furthermore important to note that the present invention contemplates provision of a means for permanently sealing the fluid system by virtue of the coaction of a resilient elastic member with a cooperating relatively hard rigid member. Accordingly, therefore, the present invention in its broadest sense contemplates the provision of a construction wherein the valve port may be formed of a resilient elastic material such as rubber whereas the movable cooperating valve member may be relatively hard. It will be apparent in such a construction that the movable member therefor should preferably be relatively large with respect to the internal diameter of the port, while the latter should be of sufficient longitudinal extent to permit the elongated movable member to shift thereinto under pressure and be grippingly engaged over a substantial portion of its length.

Obviously, the invention is not limited to the specific structural arrangement disclosed herein but is capable of other modifications and changes without departing from the spirit and scope of the present invention.

I claim:

1. A lockout device of the class described comprising a casing provided with an outlet at one end and provided at the other end with an inlet having two pressure delivery passages, said casing between the inlet and outlet having a cylindrical bore reduced in diameter at the inlet end to provide a valve seat and communicating with one of said pressure delivery passages, a substantially spherical resilient valve member movable in said bore, and of a diameter substantially greater than that of the valve seat, said cylindrical bore at its outlet end being slightly less in diameter than said resilient valve member but greater in diameter than the valve seat, a coil spring positioned in said bore and normally urging said valve member against its seat, said spring being of less diameter than the outlet end of the cylindrical bore, whereby upon predetermined reduction in outlet pressure said resilient valve member will be moved off its seat by the inlet pressure and compress the coil spring within the outlet end of the bore, said reduced outlet end of the bore being of sufficient diameter to distort the resilient valve member and lock it against spring return pressure.

2. A lockout device of the class described, comprising a chambered casing having an outlet at one end and an inlet at the other end provided with a normally closed pressure delivery passage for valve actuating pressure and a second unobstructed pressure delivery passage for constant delivery to the chamber of said casing, a resilient ball valve normally closing said first named passage, spring means to maintain said valve in closed position but permitting movement of said valve to open position upon predetermined reduction of pressure at the outlet, a bushing projecting into the outlet end of said casing and having a restricted cylindrical passage of slightly less diameter than the ball valve, said bushing adjacent the inner end of said passage having an annular recess cooperating with said passage to distort and lock by compression said resilient ball valve in outlet closing position.

CLAYTON B. SEYMOUR.